(12) United States Patent
Patterson (10) Patent No.: US 11,177,975 B2
(45) Date of Patent: Nov. 16, 2021

(54) MOVABLE SMART DEVICE FOR APPLIANCES

(71) Applicant: AT&T Intellectual Property I, L.P., Atlanta, GA (US)

(72) Inventor: Kristin Patterson, Dallas, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 283 days.

(21) Appl. No.: 15/180,897

(22) Filed: Jun. 13, 2016

(65) Prior Publication Data

US 2017/0359192 A1 Dec. 14, 2017

(51) Int. Cl.
*H04L 12/28* (2006.01)
*G08C 17/02* (2006.01)
*G08C 23/02* (2006.01)
*G08C 25/00* (2006.01)

(52) U.S. Cl.
CPC .......... *H04L 12/2823* (2013.01); *G08C 17/02* (2013.01); *G08C 23/02* (2013.01); *G08C 25/00* (2013.01); *G08C 2201/50* (2013.01)

(58) Field of Classification Search
CPC . H04L 12/2823; H04L 12/2825; H04L 67/12; H04L 12/2803; H04W 76/10
USPC ....................................................... 709/224
See application file for complete search history.

(56) References Cited

U.S. PATENT DOCUMENTS

| 7,904,511 | B2 | 3/2011 | Ryan et al. |
| 8,412,772 | B1 | 4/2013 | Nguyen et al. |
| 8,693,848 | B1 | 4/2014 | Pacor et al. |
| 8,756,163 | B2 | 6/2014 | Schleier-Smith |
| 9,021,034 | B2 | 4/2015 | Narayanan et al. |

(Continued)

FOREIGN PATENT DOCUMENTS

| EP | 3018875 | 5/2016 |
| WO | WO 2013/126784 | 8/2013 |

(Continued)

OTHER PUBLICATIONS

Jain, Puneet, et al. "FOCUS: clustering crowdsourced videos by line-of-sight." Proceedings of the 11th ACM Conference on Embedded Networked Sensor Systems. ACM, 2013. http://synrg.csl.illinois.edu/papers/focus-sensys.pdf.

(Continued)

*Primary Examiner* — David R Lazaro
*Assistant Examiner* — Zia Khurshid (57) ABSTRACT

A movable device and a method for monitoring an operation cycle of an appliance are disclosed. For example, the movable device includes an operational detection component to receive operational feedback of the appliance, wherein the operational feedback comprises a vibration of the appliance and an audible signal of the appliance, a wireless interface to establish a wireless connection with a mobile endpoint device, a processor in communication with the operational detection component to determine when the appliance is in the operation cycle based upon the operational feedback and to generate a notification message that is sent to the mobile endpoint device when the appliance has completed the operation cycle, a housing enclosing the operation detection component, the wireless interface and the processor and a connection component coupled to the housing to removably couple the apparatus to the appliance.

16 Claims, 4 Drawing Sheets

(56) References Cited

U.S. PATENT DOCUMENTS

| | | | |
|---|---|---|---|
| 9,026,596 B2 | 5/2015 | Perez et al. | |
| 9,131,028 B2 | 9/2015 | Nguyen et al. | |
| 9,253,615 B2 | 2/2016 | Ickman et al. | |
| 9,306,998 B2 | 4/2016 | Nguyen et al. | |
| 2002/0070848 A1* | 6/2002 | Adler | D06F 39/005 340/311.2 |
| 2008/0098087 A1 | 4/2008 | Lubeck | |
| 2009/0049127 A1 | 2/2009 | Juan et al. | |
| 2011/0090347 A1 | 4/2011 | Buckner et al. | |
| 2012/0084997 A1* | 4/2012 | Bellinger | D06F 58/30 34/493 |
| 2013/0198655 A1 | 8/2013 | Whitnah et al. | |
| 2013/0198788 A1 | 8/2013 | Barger et al. | |
| 2013/0346226 A1 | 12/2013 | Nunes | |
| 2014/0132418 A1* | 5/2014 | Lill | G05B 19/0428 340/679 |
| 2014/0147099 A1 | 5/2014 | Chase | |
| 2014/0280555 A1 | 9/2014 | Tapia et al. | |
| 2014/0372517 A1 | 12/2014 | Zuili et al. | |
| 2015/0128174 A1 | 5/2015 | Rango et al. | |
| 2015/0332565 A1* | 11/2015 | Cho | G08B 6/00 310/317 |
| 2016/0036958 A1* | 2/2016 | Logan | G05B 19/042 455/414.1 |
| 2016/0042364 A1 | 2/2016 | Zamer et al. | |
| 2016/0042473 A1 | 2/2016 | Danielli et al. | |
| 2016/0378186 A1* | 12/2016 | Kim | G06F 3/016 345/156 |
| 2019/0097833 A1* | 3/2019 | Doerner | G05B 23/0213 |

FOREIGN PATENT DOCUMENTS

| | | |
|---|---|---|
| WO | WO 2015/188885 | 12/2015 |
| WO | WO 2016/016752 | 2/2016 |

OTHER PUBLICATIONS

"Creating an Immersive Experience for Connected Sports Fans," Live Production, live-production.tv, Jan. 31, 2016. http://www.live-production.tv/case-studies/sports/creating-immersive-experience-connected-sports-fans.html.

"02 Participation Can't Be Pirated," R/GA FutureVision, futurevision.rga.com, accessed: May 2016. https://futurevision.rga.com/magazines/connected-spaces-connected-experiences/participation-cant-be-pirated/.

McIntyre, Hugh, "FORBES: VH1's "You Oughta Know" Concert Will Incorporate Video Shot by Fans At the Show," Forbes, forbes.com, Nov. 12, 2014. http://www.forbes.com/sites/hughmcintyre/2014/11/12/vh1s-you-oughta-know-concert-will-incorporate-video-shot-by-fans-at-the-show/?optimizely=a#64473dcd861c.

"Front-row seat: YouTube putting you in the action with virtual reality livestreams," The Telegraph, telegraph.co.uk, Apr. 16, 2016. http://www.telegraph.co.uk/technology/2016/04/19/front-row-seat-youtube-putting-you-in-the-action-with-virtual-re/.

* cited by examiner

MOVABLE SMART DEVICE FOR APPLIANCES

The present disclosure relates to smart home technology and more particularly, to a movable smart device for appliances.

BACKGROUND

Some individuals are beginning to convert their homes into smart homes or deploying home automation technology. For example, smart home fixtures and appliances are appliances, such as refrigerators, garage door openers, thermostats, light fixtures, alarms, and the like, to transmit data, be remotely controlled, and the like, via a central hub. In addition, the smart appliances or fixtures can be automatically controlled via an endpoint device of the user.

However, these types of smart home devices can be expensive due to the higher costs of smart appliances, retrofitting existing fixtures with smart home fixtures, the cost of a central hub to provide the communications, and the like. As a result, some individuals are late to adopt smart home technology and do not want to invest in the cost to fully convert his or her home into a smart home.

SUMMARY

In one example, the present disclosure discloses an apparatus, a method and a computer-readable medium for monitoring an operation cycle of an appliance. For example, the apparatus may include an operational detection component to receive operational feedback of the appliance, wherein the operational feedback comprises a vibration of the appliance and an audible signal of the appliance, a wireless interface to establish a wireless connection with a mobile endpoint device, a processor in communication with the operational detection component to determine when the appliance is in the operation cycle based upon the operational feedback and to generate a notification message that is sent to the mobile endpoint device when the appliance has completed the operation cycle, a housing enclosing the operation detection component, the wireless interface and the processor and a connection component coupled to the housing to removably couple the apparatus to the appliance.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses examples of a movable smart device for appliances. As discussed above, some individuals are beginning to convert their homes into smart homes or deploying home automation technology. For example, smart home fixtures and appliances are appliances, such as refrigerators, garage door openers, thermostats, light fixtures, alarms, and the like, to transmit data, be remotely controlled, and the like, via a central hub. In addition, the smart appliances or fixtures can be automatically controlled via an endpoint device of the user.

However, these types of smart home devices can be expensive due to the higher costs of smart appliances, retrofitting existing fixtures with smart home fixtures, the cost of a central hub to provide the communications, and the like. As a result, some individuals are late to adopt smart home technology and do not want to invest in the cost to fully convert his or her home into a smart home.

One embodiment of the present disclosure provides a movable smart device (broadly a movable device) for monitoring devices, e.g., appliances. The movable device may be attached to an appliance for monitoring a function of the appliance, e.g., for monitoring the completion of an operation cycle. When the movable device detects that the operation cycle of the appliance has completed, the movable smart device may send a wireless notification to an endpoint device of the user.

The movable device may be a relatively low cost movable device. As a result, the user may move the movable device from one appliance to another that the user wants to monitor. The way the movable device monitors the appliance, may allow the movable device to be universally compatible with any appliance. As a result, the user may use a single movable device to monitor an operation cycle of his or her appliances or a plurality of movable devices to monitor an operation cycle on each one of his or her appliances simultaneously.

Figure 1:
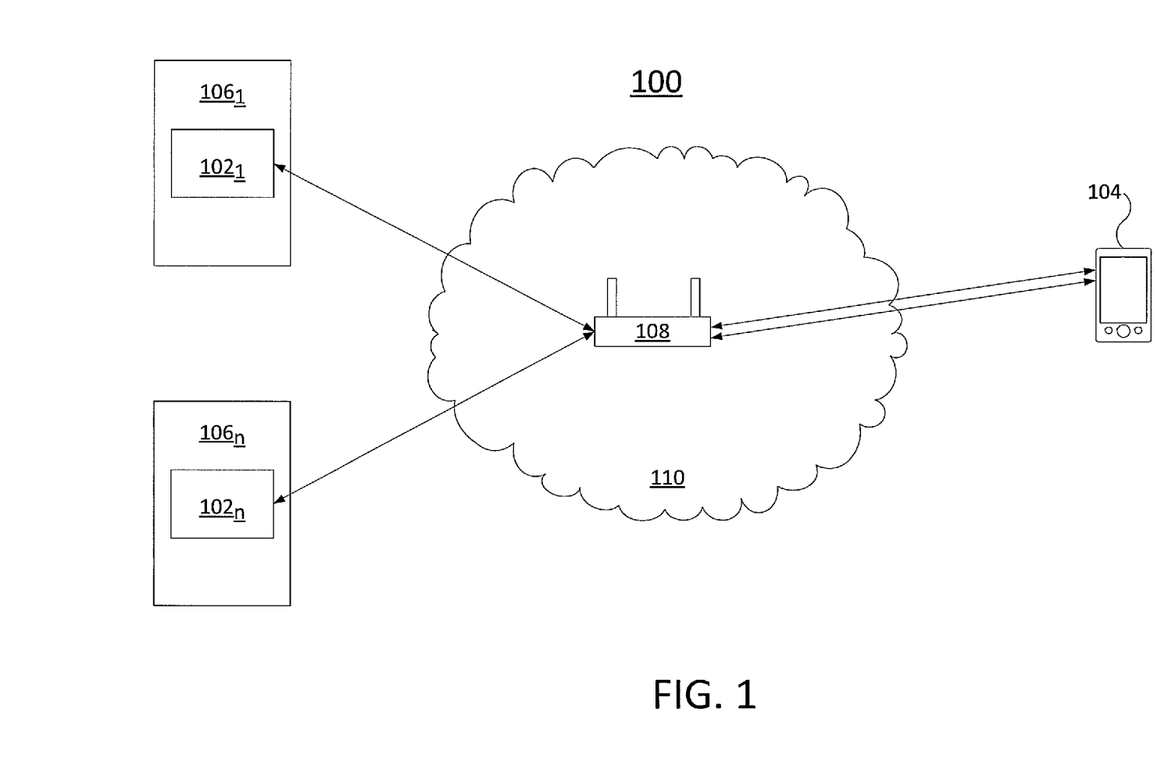
FIG. 1 illustrates an example communications network related to the present disclosure.

To aid in understanding the present disclosure, FIG. 1 illustrates an example communication network 100. In one embodiment, the communication network 100 may include an Internet Protocol (IP) network 110 that includes a network element 108. In one embodiment, the IP network 110 may be a local Wi-Fi network within a home of a user and the network element 108 may be a Wi-Fi router. In another embodiment, the IP network 110 may be a cellular network and the network element 108 may be a router or gateway of the cellular network.

It should be noted that the IP network 110 has been simplified for ease of explanation. For example, the IP network 110 may include one or more network elements that are not shown, such as, additional access networks, border elements, firewalls, routers, switches, cable modems, application servers, databases, and the like, depending on whether the IP network 110 is a Wi-Fi network or a cellular network and the like.

In one embodiment, the communication network 100 may include one or more movable smart devices $102_1$ to $102_n$ (herein also referred to individually as a movable smart device 102 or collectively as movable smart devices 102). The movable smart devices $102_1$ to $102_n$ may be coupled to, or attached to, a respective appliance $106_1$ to $106_n$ (herein also referred to individually as an appliance 106 or collectively as appliances 106). In one embodiment, the movable smart devices 102 may be attached to the respective appliances 106 via a magnet, a suction cup, a sliding tab, a Velcro strip, and the like.

In one embodiment, the appliances 106 may be different types of appliances. For example, the appliances 106 may be a washer, a dryer, a dishwasher, a refrigerator, and the like. In one embodiment, the movable smart devices 102 may monitor an operation cycle of a respective appliance 106. In one embodiment, the movable smart devices 102 may monitor the operation cycle of the respective appliances 106 based on operational feedback from the respective appliance 106.

For example, the appliances 106 may vibrate during operation or emit an audible signal when the operation cycle is complete or requires an action to be taken. The movable smart devices 102 may detect when the vibrations begin, when the vibrations stop, or when the audible signal is emitted, to determine that the operation cycle is complete or an action is required to be taken. When the movable smart device 102 detects that the operation cycle of the respective appliance 106 is complete, the movable smart device 102 may generate and transmit a notification message to an endpoint device 104 via a wireless connection that is established via the IP network 110. In one embodiment, the notification message may be a short message service (SMS) text message, a pop-up notification message via the application associated with the movable smart device 102 that is executed on the endpoint device 104, and the like.

For example, the appliance 106 may be a washer and the user may start a wash cycle (e.g., the operational cycle) and move to a room where the user cannot hear the audible signal of the washer when the wash cycle is completed or requires an action to be taken, e.g., adding a fabric softener and the like. The movable smart device 102 may be coupled to the washer and monitor when the wash cycle is completed. The movable smart device 102 will then send a notification message to the endpoint device 104, e.g., via a Wi-Fi connection of the IP network 110 in the user's home, when the wash cycle is completed. In another example, the user may be down the street at a neighbor's house. The movable smart device 102 may then send a notification message to the endpoint device 104, e.g., via a cellular connection of the IP network 110 when the wash cycle is completed.

In one embodiment, the endpoint device 104 may be a smart phone, a tablet computer, a desktop computer, and the like. The endpoint device 104 may store in memory an application that is executed by a processor of the endpoint device 104. The application may be associated with the movable smart devices 102 and allow a user to set-up the wireless connection between the IP network 110 and the movable smart devices 102.

The movable smart device 102 may detect that the operation cycle of the respective appliance 106 is completed based on the operational feedback, as noted above. In one embodiment, the operational feedback may be vibrations that can be felt by the movable smart device 102. In one embodiment, the operational feedback may be an audible signal that can be heard by the movable smart device 102.

In one embodiment, the movable smart device 102 may begin monitoring the operation cycle of the respective appliance 106 when a button is pressed on the movable smart device 102. For example, the user may press a button to instruct the movable smart device 102 to begin monitoring. In one embodiment, a small light emitting diode (LED) light may be used to indicate that movable smart device 102 is in a monitoring status.

In another embodiment, the movable smart device 102 may begin monitoring when a change in an amount of vibrations or noise of the respective appliance 106 that is detected is above a threshold level. For example, when the appliance 106 begins operating, the appliance 106 may vibrate more as the motor is running or may make more noise due to the hum of the motor, rattling of clothes, and the like.

In one embodiment, the movable smart device 102 may detect that the operation cycle has completed when a second change in the level of vibrations or noise of the respective appliance 106 is detected below the threshold level. In one embodiment, the threshold may be the same as the threshold used to automatically begin monitoring the respective appliance 106.

In one embodiment, a predefined amount of time may be used in conjunction with the threshold to avoid false positives. For example, some appliances 106, such as washers, may pause for a moment between a rinse cycle, between a wash cycle and a rinse cycle, and so forth. Thus, the movable smart device 102 may detect that the operational cycle is completed only when a change in the level of vibrations or noise is detected below the threshold for an extended period of time, e.g., at least five seconds, at least ten seconds, or any other amount of time. As a result, the movable smart device 102 will not incorrectly send a notification to the endpoint device 104 indicating that the operation cycle is completed when the appliance 106 momentarily pauses during the operation cycle.

In one embodiment, the movable smart device 102 may detect that the operation cycle has completed by comparing a pre-recorded audible signal to audible signals emitted by the respective appliance 106. For example, each appliance 106 may emit an audible signal (e.g., a predefined or unique audible signal) when the operation cycle is completed. The user may pre-record a notification signal of an operation cycle of the appliance 106 with the movable smart device 102 that can record, and store in memory, the unique audible signal that is emitted by the appliance 106 at the completion of the operation cycle. The movable smart device 102 may then simply listen to the operation cycle of the respective appliance 106 and when an audible signal matches the pre-recorded audible signal, the movable smart device 102 may determine that the operation cycle is completed or an action is required.

Notably, the way the movable smart device 102 monitors the respective appliance 106 for completion of an operation cycle is independent of the type of appliance, brand of appliance, and the like. For example, different brands of washing machines may have a different length for a normal wash cycle, different brands of dryers may have a different length for a normal dry cycle, different brands of appliances have different notification signals, and the like. However, the movable smart device 102 can monitor any brand or type of appliance for completion of an operation cycle by monitoring changes in an amount of vibration and/or an amount of audible signals, or noise, emitted by the appliances 106. The movable smart device 102 may then generate and transmit a notification to the endpoint device 104 indicating that the operation cycle is completed or requires an action to be taken.

In one example, the movable smart device 102 may be a low cost device that has no user interface. As a result, the endpoint device 104 may be used as the user interface to initially set-up and configure the movable smart device 102.

Figure 2:
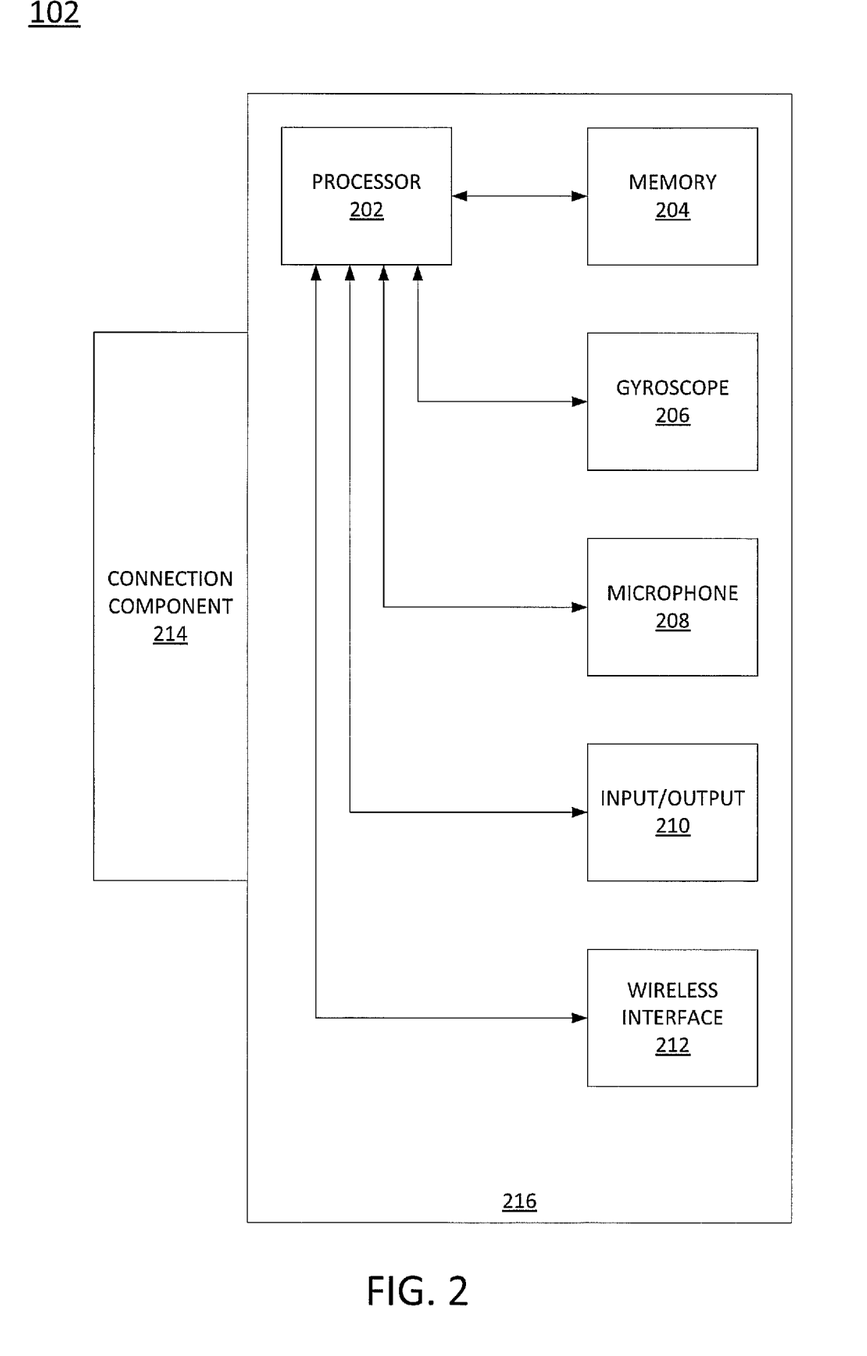
FIG. 2 illustrates an example block diagram of a movable smart device.

FIG. 2 illustrates a block diagram of an example of the movable smart device 102 (broadly a movable device). In one embodiment, the movable smart device 102 may include a processor 202. The processor 202 may be in communication with a memory 204, a gyroscope 206 (broadly an operational detection component), a microphone 208 (broadly an operational detection component), an input/output interface 210 and a wireless interface 212. A housing 216 may enclose the processor 202, the memory 204, the gyroscope 206, the microphone 208, the input/output interface 210 and the wireless interface 212. The housing 216 may be a plastic or a metallic enclosure.

In one embodiment, the memory 204 may be a non-transitory computer readable storage medium. For example, the memory 204 may be a random access memory (RAM), or any other type of memory. The memory 204 may store the thresholds for detecting when the operation cycle of the respective appliance 106 begins and ends. In one embodiment, the thresholds may be based on a type of appliance 106 that the movable smart device 102 is coupled to. For example, during the configuration of the movable smart device 102 via the endpoint device 104, the user may enter the make and model of the appliance 106. A table of thresholds for each type of appliance, make and model may be stored in the memory 204, e.g., the thresholds may be downloadable from websites of appliance manufacturers. In one embodiment, the memory 204 may also store the pre-recorded audible signal that is pre-recorded by the user.

In one embodiment, the gyroscope 206 may detect the vibrations, or movements, of the respective appliance 106. In one embodiment, the microphone 208 may be used to detect the noise or audible signal emitted by the respective appliance 106. In one embodiment, the microphone 208 may also be used to record the notification signal corresponding to the operation cycle of the respective appliance 106 to record the unique audible signal of the respective appliance 106 when the operation cycle is completed or an action is required. The pre-recorded audible signal may be used to detect when the operation cycle of the respective appliance 106 is completed, as discussed above.

In one embodiment, the input/output interface 210 may be a button that can perform one or more different functions, a light emitting diode (LED) light indicating a status of the movable smart device 102, and the like. For example, a button may be pressed quickly (e.g., less than 2 seconds) to instruct the movable smart device 102 to begin monitoring the respective appliance 106. The button may be held in longer (e.g., more than 2 seconds) to begin recording the notification signal or other audible signature or pattern relating to the operation cycle. The LED light may be used to indicate when the movable smart device 102 is in a monitoring status (e.g., a blinking green LED light), a recording status (e.g., a continuous red light), an error status (e.g., a blinking red LED light), when a wireless connection is not detected (e.g., a continuous amber LED light), and the like.

In one embodiment, the wireless interface 212 may be used to establish a wireless connection with the network element 108 in the IP network 110. The wireless interface 212 may receive and transmit messages to and from the processor 202 and the endpoint device 104 that are transmitted over the wireless connection.

In one embodiment, the movable smart device 102 may also include a connection component 214. The connection component 214 may be coupled to an external side of the housing 216. As discussed above, the connection component 214 may be a magnet, a suction cup, a sliding tab, a Velcro strip, and the like. The movable smart device 102 may be removably attached to a respective appliance 106 via the connection component 214. As a result, the user may purchase a single movable smart device 102 and move the movable smart device 102 between the user's different appliances 106 to monitor the operation cycle of the different appliances 106.

Figure 3:
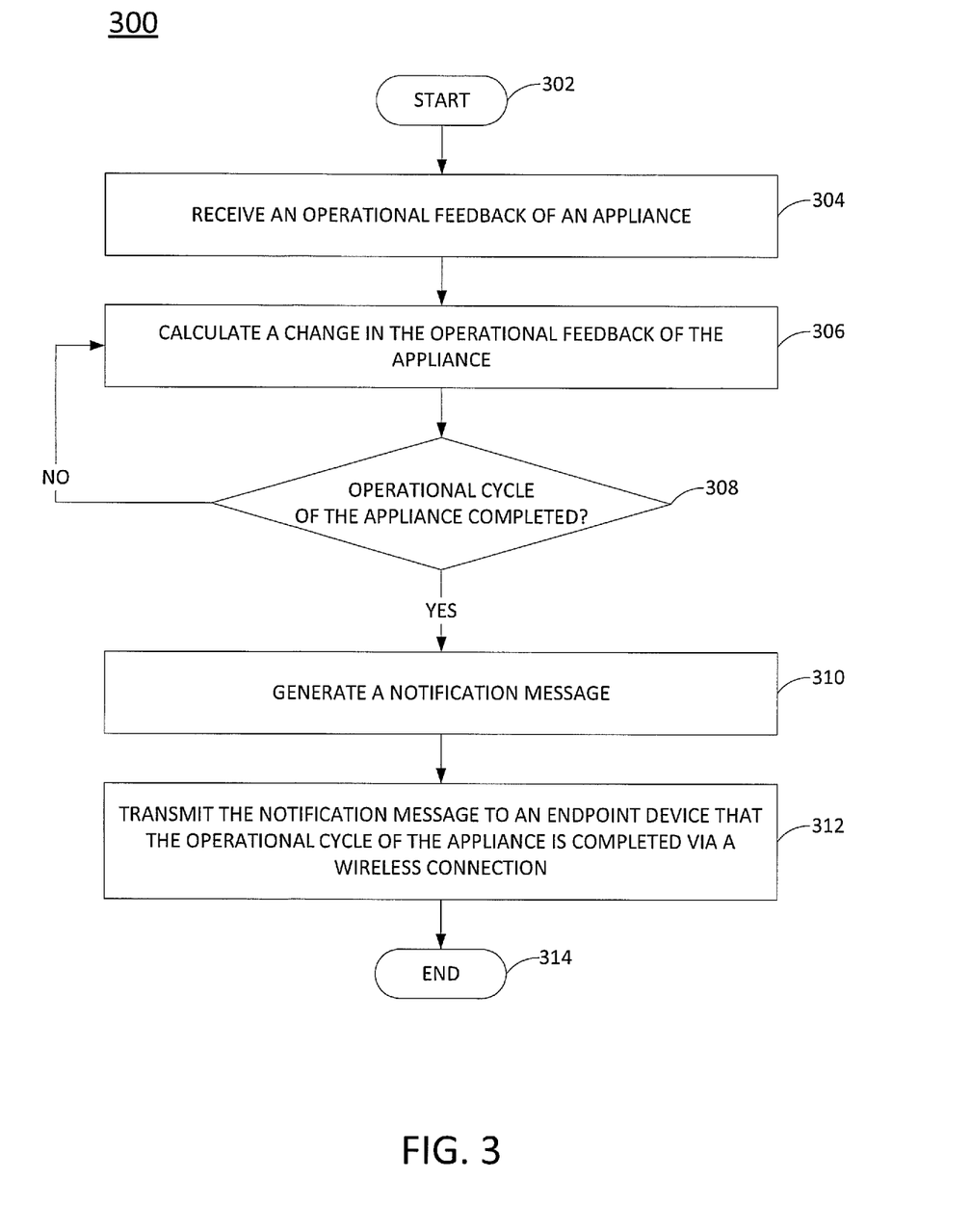
FIG. 3 illustrates a flowchart of an example method for monitoring an operation cycle of an appliance.

FIG. 3 illustrates a flowchart of an example method 300 for monitoring an operation cycle of an appliance in accordance with the present disclosure. In one embodiment, steps, functions, and/or operations of the method 300 may be performed by a movable smart device 102 that is removably attached to an appliance. In one embodiment, the steps, functions, or operations of method 300 may be performed by a computing device or system 400, and/or processor 402 as described in connection with FIG. 4 below. For illustrative purpose, the example method 300 is described in greater detail below in connection with an embodiment performed by a processor, such as processor 402.

The method 300 begins in step 302. At step 304, a processor receives an operational feedback of an appliance. For example, the operational feedback may be a vibration of the appliance detected by a gyroscope, an audible signal of the appliance detected by a microphone, and the like.

In one embodiment, the audible signal that the appliance emits when the operation cycle is completed or requires an action may be pre-recorded and stored in memory. Thus, the operational feedback may be a subsequent audible signal emitted by the appliance. The subsequent audible signal may be compared to the audible signal that is stored to determine whether the operation cycle is completed, as discussed in further detail below.

At step 306, the processor calculates a change in the operational feedback of the appliance. For example, once the movable smart device is engaged to begin monitoring, the movable smart device may begin tracking the vibration level or a decibel level of the audible signal of the appliance. For example, the processor may calculate a continuous average of the levels of vibration or decibels. The processor may then take a current value of the level of vibration or the current decibel value and calculate a change in the current value of the vibration or the current decibel value to the average level of vibrations or decibels.

At step 308, the processor determines if the operational cycle of the appliance is completed or requires an action. In one embodiment, if the change in the vibration and/or decibel level of the audio signal is below a threshold level, then the processor may determine that the operational cycle of the appliance is completed or requires an action. For example, the threshold may be 50 decibels for the audible signal. When the appliance is operating the average decibel level may be 70 decibels. Suddenly, the decibel level of the appliance may drop to 0 decibels. Thus, the change of 70 decibels may be greater than the 50 decibel threshold and the processor may determine that the operation cycle of the appliance is completed or requires an action.

As discussed above, a pre-determined amount of time may be used in conjunction with the threshold. For example, to avoid false positives the processor may monitor to see if the change is maintained for an extended period of time, e.g., at least 5 seconds (or any other amount of time). The pre-determined amount of time may ensure that the processor does not prematurely determine the operation cycle is completed or requires an action when an appliance pauses between cycles of the operation cycle (e.g., a pause between a wash cycle and a rinse cycle of the operation cycle of a washing machine).

If the operational cycle of the appliance is not completed or does not require an action, then the method 300 may return to step 306. The method 300 may cycle between steps 306 and 308 until the operational cycle of the appliance is completed or requires an action. If the operational cycle of the appliance is completed or requires an action, the method 300 may proceed to step 310.

At step 310, the processor generates a notification message. The notification message may indicate that the operation cycle of the appliance is completed or requires an action. The notification message may be a short message service (SMS) text message, a pop-up notification via the application executed on the endpoint device of the user, and the like.

At step 312, the processor transmits the notification message to an endpoint device that the operation cycle of the appliance is completed or requires an action via a wireless connection. For example, the notification message may be transmitted via a Wi-Fi wireless connection or a cellular wireless connection. At step 314, the method 300 ends.

It should be noted that although not specifically specified, one or more steps, functions or operations of the method 300 may include a storing, displaying and/or outputting step as required for a particular application. In other words, any data, records, fields, and/or intermediate results discussed in the respective methods can be stored, displayed and/or outputted to another device as required for a particular application. Furthermore, steps, blocks or operations in FIG. 3 that recite a determining operation or involve a decision do not necessarily require that both branches of the determining operation be practiced. In other words, one of the branches of the determining operation can be deemed as an optional step. In addition, one or more steps, blocks, functions or operations of the above described method 300 may comprise optional steps, or can be combined, separated, and/or performed in a different order from that described above, without departing from the example embodiments of the present disclosure. Furthermore, the use of the term "optional" in the above disclosure does not mean that any other steps not labeled as "optional" are not optional. As such, any claims not reciting a step that is not labeled as optional is not to be deemed as missing an essential step, but instead should be deemed as reciting an embodiment where such omitted steps are deemed to be optional in that embodiment.

Figure 4:
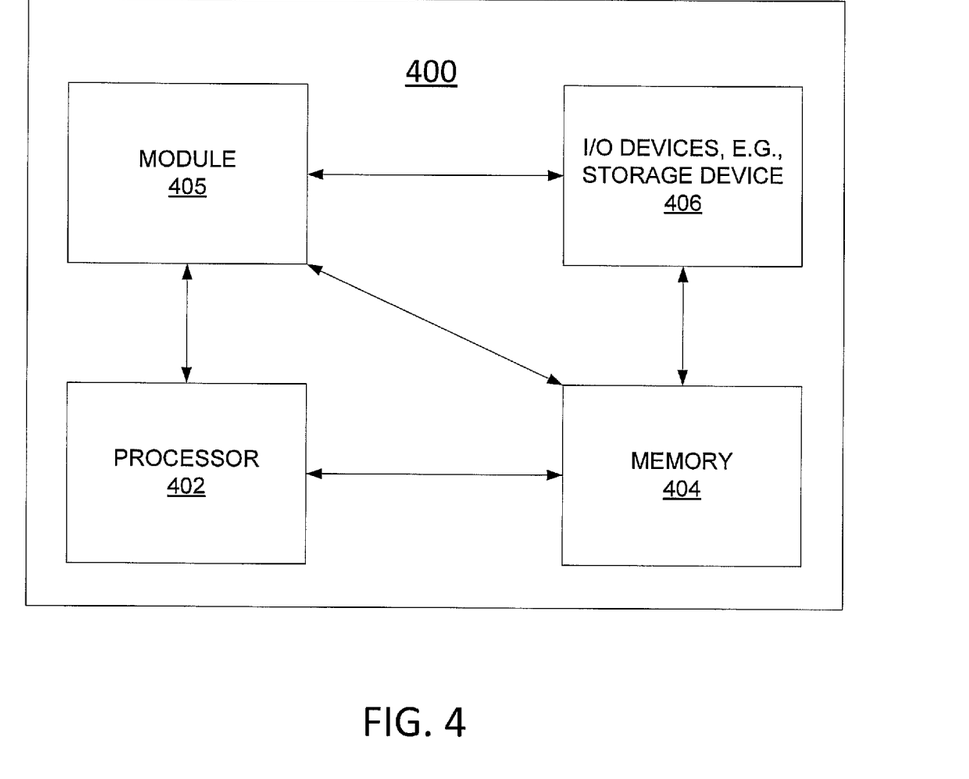
FIG. 4 illustrates a high-level block diagram of a computer suitable for use in performing the functions described herein.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for monitoring an operation cycle of an appliance, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300, as discussed above, is implemented in a distributed or parallel manner for a particular illustrative example, i.e., the steps of the above method 300, or the entirety of method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one embodiment, instructions and data for the present module or process 405 for monitoring an operation cycle of an appliance (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for monitoring an operation cycle of an appliance (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. An apparatus for monitoring an operation cycle of an appliance, the apparatus comprising:
   an operational detector to determine an operational feedback generated by the appliance when the operational detector is in operation, wherein the operational feedback comprises a vibration level of the appliance and a decibel level of an audible signal of the appliance;
   a wireless interface to establish a wireless connection with a mobile endpoint device;
   a processor in communication with the operational detector to determine when the appliance has completed the operation cycle when a difference between a current level of the operational feedback determined by the operational detector and a previous level of the operational feedback determined by the operational detector is greater than a predefined threshold difference for a predetermined period of time and to generate after the predetermined period of time has transpired a notification message that is sent to the mobile endpoint device when the appliance has completed the operation cycle, wherein the previous level of the operational feedback comprises a continuous average of previous levels of the operational feedback, wherein the difference is determined from a current value of the vibration level of the current level of the operational feedback as compared to an average level of vibrations of the previous level of the operational feedback, or a current decibel value of the decibel level of the current level of the operational feedback as compared to an average level of decibels of the previous level of the operational feedback;

a housing enclosing the operational detector, the wireless interface and the processor; and a connection component coupled to the housing to removably couple the apparatus to the appliance, wherein the apparatus is distinct from the appliance.

2. The apparatus of claim 1, wherein the operational detector comprises a gyroscope to detect the vibration level of the appliance.

3. The apparatus of claim 1, wherein the operational detector comprises a microphone to detect the decibel level of the audible signal of the appliance.

4. The apparatus of claim 3, wherein the apparatus further comprises a button that is accessible on the housing, wherein the button is to initiate a first recording of the audible signal via the microphone in response to a first input having a duration that meets a threshold duration and further to initiate operation of the operational detector in response to a second input, received subsequent to the first input, that meets a second threshold duration different than the first threshold duration.

5. The apparatus of claim 1, wherein the connection component comprises at least one of a magnet or a suction cup.

6. The apparatus of claim 1, wherein the wireless connection comprises a Wi-Fi connection.

7. The apparatus of claim 1, wherein the wireless connection comprises a cellular connection.

8. A method for monitoring an operation cycle of an appliance, the method comprising:

initiating, by a processor of a device removably coupled to the appliance, an operational detector of the device for determining an operational feedback generated by the appliance, wherein the operational feedback comprises a vibration level of the appliance and a decibel level of an audible signal of the appliance, wherein the device is distinct from the appliance;

receiving, by the processor, the operational feedback;

calculating, by the processor, a change in the operational feedback of the appliance as a difference between a previous level of the operational feedback determined by the operational detector and a current level of the operational feedback determined by the operational detector, wherein the previous level of the operational feedback comprises a continuous average of previous levels of the operational feedback, wherein the difference is determined from a current value of the vibration level of the current level of the operational feedback as compared to an average level of vibrations of the previous level of the operational feedback, or a current decibel value of the decibel level of the current level of the operational feedback as compared to an average level of decibels of the previous level of the operational feedback;

determining, by the processor, that the operation cycle of the appliance has completed when the change in the operational feedback is greater than a predefined threshold difference for a predetermined period of time;

generating, by the processor after the predetermined period of time has transpired, a notification message; and transmitting, by the processor, the notification message to an endpoint device that the operation cycle of the appliance is completed via a wireless connection.

9. The method of claim 8, wherein the vibration level of the appliance is detected by a gyroscope of the operational detector.

10. The method of claim 8, wherein the decibel level of the audible signal of the appliance is detected by a microphone of the operational detector.

11. The method of claim 10, wherein the operational feedback comprises the audible signal, and the initiating the operational detector comprises:

pre-recording, by the processor via a microphone of the device and in response to a first input having a duration that meets a first threshold duration, a first recording of the audible signal of the appliance; and storing, by the processor, the first recording in a memory of the device.

12. A non-transitory computer-readable storage device storing a plurality of instructions which, when executed by a processor of a device removably coupled to an appliance, cause the processor to perform operations for monitoring an operation cycle of the appliance, wherein the device is distinct from the appliance, the operations comprising:

initiating an operational detector of the device for determining an operational feedback generated by the appliance, wherein the operational feedback comprises a vibration level of the appliance and a decibel level of an audible signal of the appliance, wherein the device is distinct from the appliance;

receiving the operational feedback;

calculating a change in the operational feedback of the appliance as a difference between a previous level of the operational feedback determined by the operational detector and a current level of the operational feedback determined by the operational detector, wherein the previous level of the operational feedback comprises a continuous average of previous levels of the operational feedback wherein the difference is determined from a current value of the vibration level of the current level of the operational feedback as compared to an average level of vibrations of the previous level of the operational feedback, or a current decibel value of the decibel level of the current level of the operational feedback as compared to an average level of decibels of the previous level of the operational feedback;

determining that the operation cycle of the appliance has completed when the change in the operational feedback is greater than a predefined threshold difference for a predetermined period of time;

generating, after the predetermined period of time has transpired, a notification message; and transmitting the notification message to an endpoint device that the operation cycle of the appliance is completed via a wireless connection.

13. The non-transitory computer-readable storage device of claim 12, wherein the vibration level of the appliance is detected by a gyroscope of the operational detector.

14. The non-transitory computer-readable storage device of claim 12, wherein the decibel level of the audible signal of the appliance is detected by a microphone of the operational detector.

15. The non-transitory computer-readable storage device of claim 14, wherein the operational feedback comprises the audible signal, and the initiating the operational detector comprises:
- pre-recording, by the processor via a microphone of the device and in response to an input having a duration that meets a threshold duration, a first recording of the audible signal of the appliance; and
- storing, by the processor, the first recording in a memory of the device.

16. The method of claim 11, wherein the pre-recording is performed prior to the initiating, and wherein the initiating is performed in response to a second input received subsequent to the first input and having a duration that meets a second threshold duration different from the first threshold duration.

* * * * *